Aug. 14, 1934.   H. L. BLUM   1,969,960
DRINK DISPENSER
Filed Nov. 30, 1932
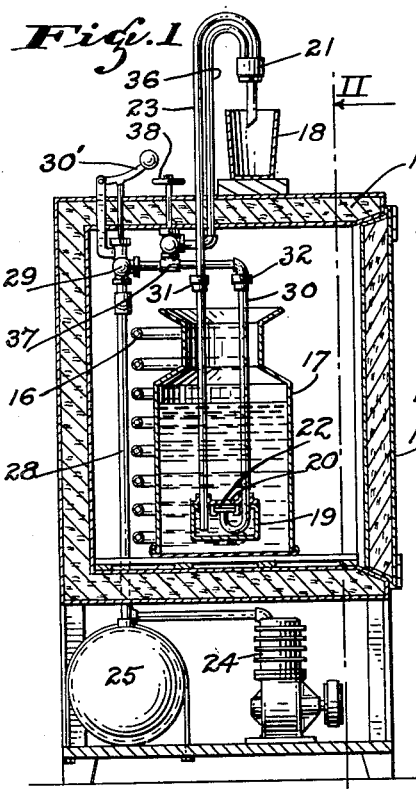
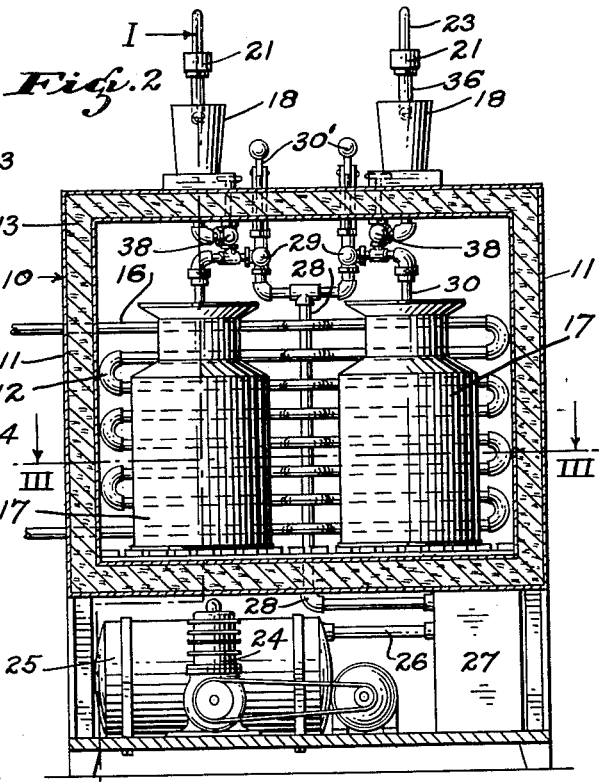
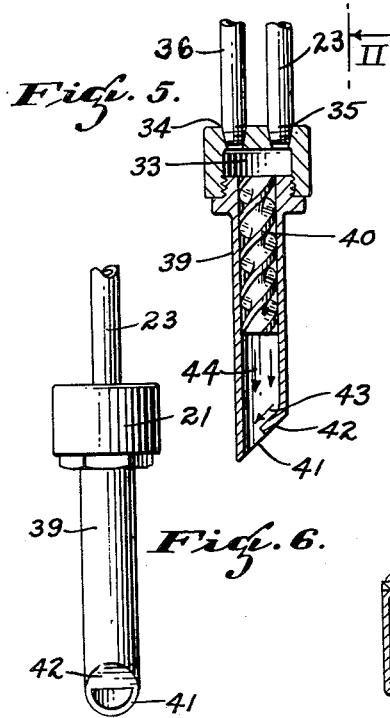
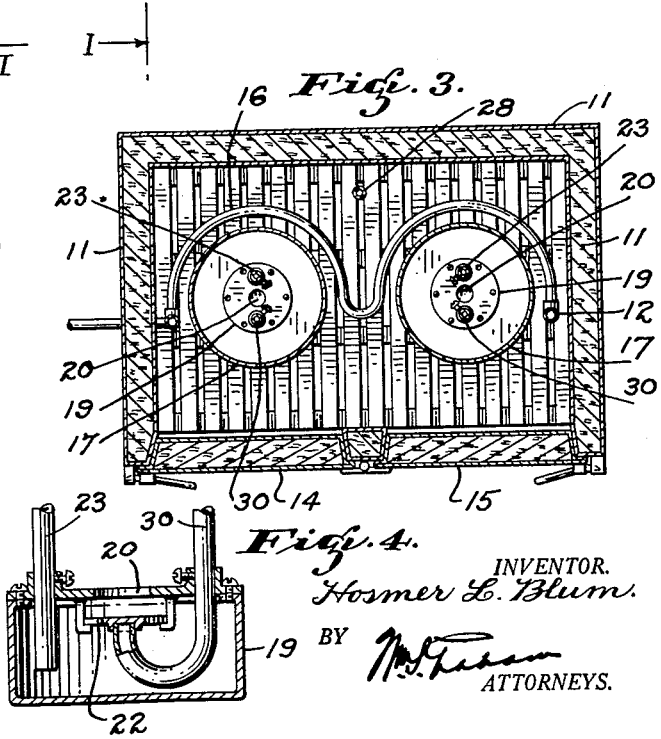
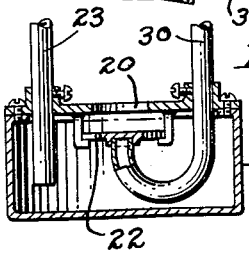
INVENTOR.
Hosmer L. Blum.
BY
ATTORNEYS.

Patented Aug. 14, 1934

1,969,960

UNITED STATES PATENT OFFICE 1,969,960

DRINK DISPENSER

Hosmer L. Blum, San Francisco, Calif.

Application November 30, 1932, Serial No. 644,939

8 Claims. (Cl. 225—21)

This invention relates to a drink dispenser and more particularly to an improved device for dispensing liquid from a supply container in predetermined amounts and in subjecting the liquid to a treatment during the dispensing operation.

It is one object of this invention to provide an improved drink dispenser.

Another object is to provide a novel drink dispenser having means for dispensing a predetermined amount of liquid from a supply container and in cooling and aerating the liquid during the dispensing operation.

Another object is to provide in a device for dispensing liquids, novel means for transferring a predetermined amount of liquid from one container to another and in subjecting the liquid to a treatment while in transit.

A further object is to provide in a device having the above characteristics, novel means for agitating, aerating and cooling the liquid during the dispensing operation.

A still further object is to provide a device having the above characteristics that shall be simple in structure, efficient, easy to operate, durable and comparatively cheap to manufacture.

The above and other objects will be made apparent throughout the further description of the invention when taken in connection with the accompanying drawing wherein like reference characters refer to like parts. It is to be distinctly understood that the drawing is not a definition of the invention but is merely one form of the apparatus for carrying out the invention as defined by the appended claims.

In the drawing:—

Fig. 1 is a sectional view taken on the line I—I of Fig. 2.

Fig. 2 is a sectional view taken on the line II—II of Fig. 1.

Fig. 3 is a sectional view taken on the line III—III of Fig. 2.

Fig. 4 is an enlarged detail sectional view of a dispensing chamber embodying the invention.

Fig. 5 is an enlarged detail sectional view of a dispensing nozzle embodying the invention, and Fig. 6 is an elevational view of Fig. 5.

In the form shown, 10 indicates in its entirety a refrigeration or cooling compartment which may be a portion of a refreshment fountain, the bottom, top and side walls of which may be constructed of metal plates 11 and 12, the plates 11 and 12 being spaced apart and having a suitable heat insulating material 13, which may be cork, interposed therebetween for the well known purpose.

The compartment 10 is provided with suitable doors 14 and 15 in the front wall thereof for rendering access to the compartment.

Means are provided for maintaining the compartment at a desired temperature, which means may consist of expansion coils 16. The expansion coils 16 are preferably formed as shown in Fig. 3, for the purpose of receiving and surrounding a liquid container 17. The compartment may be of sufficient size to accommodate one or more containers 17 and the expansion coils 16 arranged accordingly. For the purpose of illustration, the containers 17 may be the conventional milk can adapted to contain a supply of a ready mix drink solution.

Novel means is provided for dispensing or transferring a predetermined amount of the ready mixture from the supply container 17 to a serving glass or container 18, which means consist of a novel dispensing chamber 19 disposed within the container 17 and positioned near the bottom thereof. The chamber 19 may rest on the bottom of the container 17 or it may be suspended within the container 17 and held in position near the bottom of the container 17. The chamber 19 is provided with a valve opening 20 in its top through which the ready mixture in the container 17 is adapted to pass for filling the chamber 19.

Novel means is provided for transferring the ready mixture in the chamber 19 by way of an aerating and cooling device or nozzle 21. The structure and operation of the latter will be hereinafter described.

The means for transferring the liquid from the chamber 19 to the serving glass 18 consist of a valve 22 positioned within the chamber 19 and adapted to close the opening 20.

Means are provided for closing the valve 22 and forcing the liquid in the chamber 19 through the conduit 23 and nozzle 21, which means comprises a source of air under pressure adapted to close the valve 22 and force the liquid from the chamber 19. The air may be supplied by means of the compressor 24 employed for supplying air to the tank 25, the air pressure within the tank 25 being preferably maintained at a predetermined pressure. The air is delivered to the valve 22 by way of conduit 26, cooler 27, conduit 28, control or actuating valve 29 and conduit 30.

It can now be seen that upon opening the actuating valve by the control lever 30' that the compressed air will be admitted to the chamber 19 and valve 22 by way of the valve 29 for closing the valve 22 and forcing the liquid in the chamber 19 by way of the conduit 23 into the serving glass 18. Suitable connecting means 31 and 32 are provided for disconnecting the conduits 23 and 30 respectively for the purpose of removing the dispensing chamber 19 from the container 17 for the purpose of cleaning and sterilizing.

Novel means is provided for agitating, aerating and further cooling the liquid passing through the nozzle 21; which means comprises a chamber 33 provided in the upper portion of the nozzle 21 and having openings 35 and 34 for receiving the outlet ends of the conduits 23 and 36 respectively. The conduit 36 is here employed as an auxiliary air line leading from the main air conduit 30, as shown at 37. The conduit 36 is provided with a valve mechanism 38 for regulating the flow of air through the conduit 36 and into the chamber 33 of the nozzle 21. The nozzle 21 is further provided with an elongated tubular member 39 having a spiral band 40 positioned therewithin. The opening through the tubular member 39 is adapted to register with the chamber 33, as clearly shown by Fig. 5.

It will now be understood that upon actuating the lever 30, air under pressure will be admitted simultaneously to the valve 22 in the chamber 19 and to the chamber 33 in the nozzle 21, and it follows that the cooled air and the liquid from the chamber 19 will be simultaneously admitted to the chamber 33 in the nozzle 21, the air and liquid passing through the elongated portion 39 by way of the spiral band 40 for the purpose of violently agitating the liquid as well as simultaneously aerating and cooling said liquid. The lower end of the elongated tubular member 39 terminates in a beveled portion 41, the opening in the lower end of the elongated portion being preferably partially closed by a baffle plate 42. This baffle plate 42 tends to further agitate the liquid passing from the nozzle 21 into the serving cup 18, since a portion of the liquid passing downwardly through the tubular member 39 will come in contact with the inner surface of the baffle 42 and be deflected, as shown by arrow 43, into the path of another portion of the liquid passing through the tubular member 39, as shown by arrow 44.

The valve mechanism 38 in the conduit 36 may remain open at all times, the valve being provided for regulating the amount of air delivered to the chamber 33 during the dispensing operation.

In the form shown, separate means 16 and 27 are provided for cooling the compartment 10 and the air supply. However, it is to be understood that both the compartment 10 and the air supply may be cooled by the same refrigeration source.

The dispensing chamber 19 is preferably designed to accommodate sufficient liquid to fill the serving glass 18 plus an additional amount that may be required for rendering the operation efficient.

The operation of the device is as follows:— The serving glass 18 is placed in position under the nozzle 21; the actuating lever 30' is operated to open the valve 29 for admitting air to the chamber 19 and nozzle 21. The air operates to close the valve 22 in the chamber 19 and to force the liquid in the chamber 19 through the conduit 23 and nozzle 21, while at the same time air is admitted to the nozzle 21 by way of the valve mechanism 38 and conduit 30.

Immediately upon releasing the operating lever 30 for closing the valve 29, the valve 22 in the chamber 19 will instantly open, by means of gravity, and admit liquid to the chamber 19 for a subsequent operation.

There is accordingly provided a drink dispenser which is novel and simple in structure, efficient in operation, durable, which may be readily assembled and disassembled for sterilizing, inspection and repair, and which is comparatively cheap to manufacture.

While I have illustrated and described but one embodiment of the invention, it will be apparent to those skilled in the art that certain changes, substitutions, modifications, additions and omissions may be made without departing from the spirit and scope of the invention, as defined by the appended claims.

I claim:—

1. A dispensing device including a dispensing nozzle having a chamber therein, a pair of openings in said chamber adapted to receive the ends of a liquid conduit member and a compressed air conduit member, another opening diametrically oppositely disposed to the first said openings adapted to receive one end of an elongated tubular member, a spiral band within said tubular member, said tubular member terminating in a bevelled portion, and a baffle plate partially closing the opening of the bevelled portion of said tubular member.

2. In a dispensing apparatus for dispensing a predetermined amount of liquid from a supply container, comprising a dispensing chamber, a dispensing nozzle, means for supplying compressed air to said chamber, means for cooling said air, a conduit connecting said chamber with said nozzle through which the liquid is adapted to pass, an auxiliary conduit connecting the first said means with said nozzle, and an actuating handle for simultaneously supplying air to said chamber and said nozzle, the said nozzle having a common chamber associated with the conduit connecting said chamber with said nozzle and auxiliary air conduit.

3. A dispensing device including a dispensing nozzle, said nozzle having a chamber therein, separate means for supplying liquid and air simultaneously to said chamber, and an elongated tubular member leading from said chamber, said tubular member terminating in a bevelled end through which the liquid and air are adapted to pass.

4. A claim in accordance with claim 3, wherein said bevelled end is provided with a deflecting means for deflecting a portion of the liquid passing through said tubular member into the path of another portion of the liquid passing through said tubular member.

5. A drink dispenser comprising a supply container, a conduit for connecting said supply container with another container, and means for inducing a flow of a liquid from said supply container by way of said conduit to said other container, said means including means for subjecting the liquid flowing through said conduit to the action of a fluid, the latter adapted to induce the flow of said liquid through said conduit and simultaneously aerate and cool said liquid while passing through said conduit.

6. An apparatus of the class described comprising a source of liquid to be treated, means for treating said liquid, said means including a conduit through which the liquid being treated is adapted to flow, means including means for supplying a gaseous fluid for inducing the flow of said liquid through said conduit, and another means for supplying a gaseous fluid for simultaneously aerating and cooling said liquid during the flow of said liquid through said conduit.

7. A dispensing device including a container, a dispensing chamber suspended in said container, said dispensing chamber having an opening therein for admitting fluid, a valve for opening and closing said opening, means for supplying air within said dispensing chamber for closing said valve and subsequently forcing the medium contained in said chamber therefrom, a conduit associated with said chamber through which said medium may be forced, and another means for supplying air to the medium during its transit through said conduit.

8. A dispensing device including a container, a dispensing chamber in said container, said dispensing chamber having an opening therein for admitting fluid, a valve for opening and closing said opening of the dispensing chamber, means for supplying air within said dispensing chamber for closing said valve and subsequently forcing the medium contained in said chamber therefrom, a conduit associated with said chamber through which said medium may be forced, and another means for supplying air to the medium during its transit through said conduit.

HOSMER L. BLUM.